Feb. 17, 1970  W. N. JONES, JR  3,495,936
DILUTE PHASE CHLORINATION OF TITANIFEROUS ORES
Filed June 8, 1967
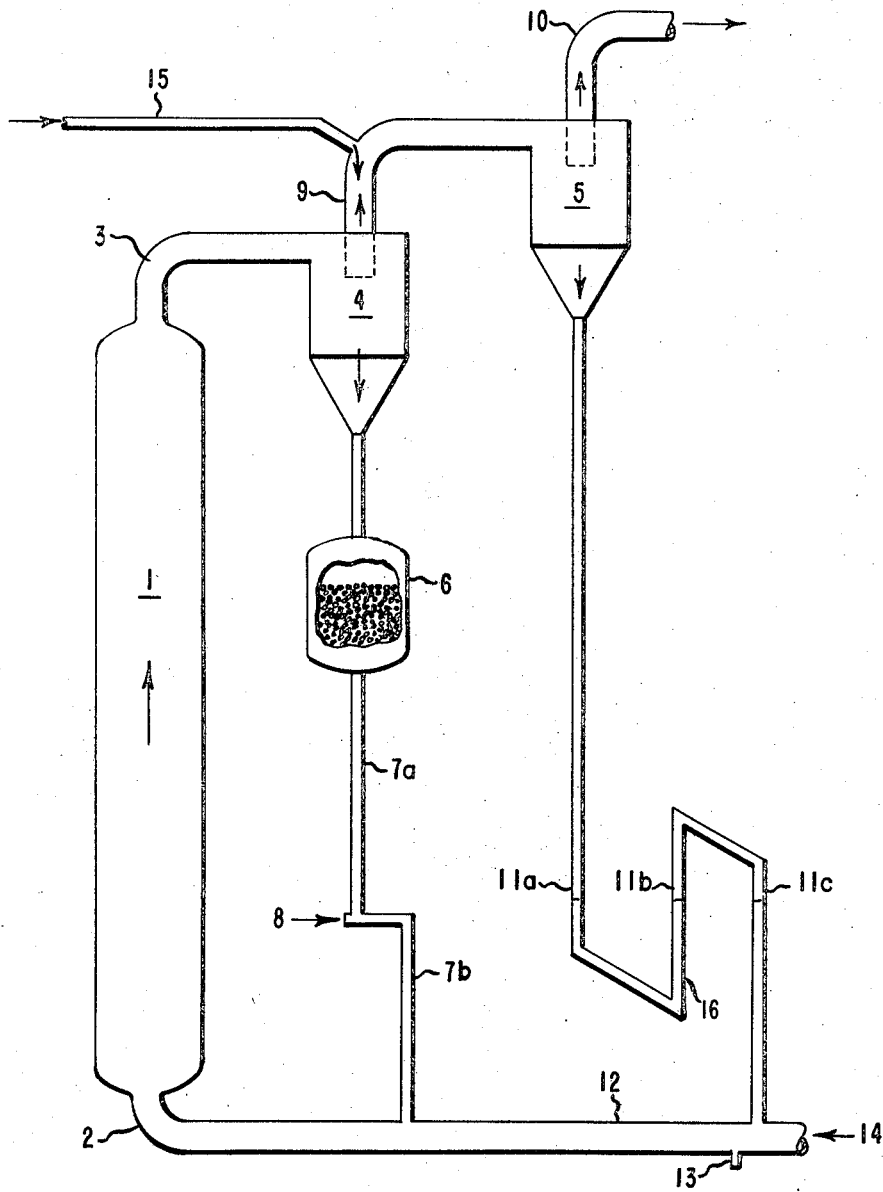
INVENTOR
WEBSTER N. JONES, JR.
BY *Carl A. Hechmer*
ATTORNEY

United States Patent Office 3,495,936
Patented Feb. 17, 1970

3,495,936
DILUTE PHASE CHLORINATION OF TITANIFEROUS ORES
Webster N. Jones, Jr., Wilmington, Del., assignor to E. I. du Pont de Nemours and Company, Wilmington, Del., a corporation of Delaware
Filed June 8, 1967, Ser. No. 644,630
Int. Cl. C01g 23/02; C01b 9/02
U.S. Cl. 23—87                                 4 Claims

ABSTRACT OF THE DISCLOSURE

Titaniferous ore is reacted with chlorine and a carbonaceous reducing agent in a dilute-phase reactor system to yield metal chloride products, chiefly titanium tetrachloride.

BACKGROUND OF THE INVENTION

At the present time, most industrial chlorination of titanium-bearing ores is carried out in a fixed or fluidized bed operation. In the fluid bed operation, which has been preferred, the ores in particulate form are fluidized in a closed reactor by gases comprising reducing-chlorinating agents. Although such operations are entirely feasible, some of the operational problems associated with these fluidization-chlorination process relate to the high temperatures which are required for efficient operation and to the corrosion and abrasion of the reactor and the associated feed, separation, and recycle chambers and conduits. Thermal stresses put severe strain on parts of the equipment. Moreover, in the operation of a fluidized bed process, gas distribution becomes a problem because of build-up of solids on the surfaces of the small openings which serve as gas inlets. The processes must be operated within carefully defined limits as regards temperatures and gas velocities in order to maintain fluidization of the bed without "slugging."

SUMMARY OF THE INVENTION

In accordance with the present invention a process for the chlorination of titaniferous ores in a dilute-phase reaction system is provided which comprises the steps of (1) introducing into a dilute-phase reaction chamber (a) a solid feed comprising titaniferous ore and solid carbonaceous reducing agent, and, (b) a gas comprising chlorine; at least about 80% of the ore in the solid feed having a particle size in the range of −60 +200 mesh, and at least 70% of the solid carbonaceous reducing agent of the solid feed having a particle size in the range of −20 +60 mesh; (2) maintaining within the dilute-phase reaction chamber a solid charge of from 4 to 8 lbs./cu. ft. of reactor volume, and a gas volocity within said reactor of from 8 to 40 lineal ft./second, and at a temperature of 850° to 1300° C.; and (3) separating the gaseous chloride products from the unreacted solids.

DESCRIPTION OF THE DRAWING

The invention will be more readily understood by reference to the drawing wherein an apparatus which is useful in the process of the present invention is shown diagrammatically. The dilute-phase reaction chamber shown as 1, has associated therewith an inlet pipe 2 and an exit conduit 3. The exit conduit leads into one, or the first of a series, of cyclone separators, two such separators being shown as 4 and 5. From the first cyclone 4, separated solids are dropped into a hold-up bin 6. Fresh feed of ore and coke enters this system through line 15; or, if desired, fresh feed can be introduced directly into the hold-up bin 6. A return feed line 7A and 7B carries recycle solids, together with a mixture of fresh feed and coke from feed line 15 or hold-up bin 6, back to the chlorinator. Flow of this solid reactor feed is controlled in part by introduction of an inert gas through an angular section of a return feed line at 8. Blowover solids and reactor gases are exhausted from the first cyclone through line 9 to a second cyclone. From the second cyclone an exhaust line 10 carries off metal chloride products and by-products of the operation, the principal product being titanium tetrachloride. From the bottom of the second cyclone, separated solids are carried to a seal leg 11A, 11B, and 11C. Feed of solids to the feed line 12 is controlled in part by flow of inert gas upward into a vertical section of the seal leg 16, to effect fluidization of the solids within this section. Solids are transported into the chlorination vessel by gas feed in line 12 comprising both recycle gas and virgin chlorine, entering through inlet 14. In addition, a supply of gas comprising oxygen is also available for introduction into line 12, through inlet 13 as desired, to effect burning of fuel either for initial heat-up of the system, or to insure proper heat balance in the dilute-phase reactor.

The solids fed into the reactor include ore and a carbonaceous reducing agent, as for example, coke, used as fuel and as a reductant for the titaniferous ore which is to be chlorinated. It has been determined that in the operation of a dilute-phase chlorination process for reacting titaniferous ores, the parameter of major importance is the weight of solid carbonaceous reducing agent contained in the reactor. The operation of the dilute-phase reactor has been carried out very satisfactorily when the solids charge in the reactor is maintained at about 40% solid reductant and 60% ore. Where the desired reductant is coke, the total ore-coke charge in the reactor may be held at about 4 to 10 lbs./cu. ft. of reactor volume, the preferred load being from about 6 to about 8 lbs./cu. ft. The process may be efficiently operated at gas velocities within the reactor in the range of about 8 to about 40 lineal ft./second; the preferred velocity in the range of 10 to 15 ft./second. The gas velocity must, of course, be adjusted to a flow which will carry the ore-solid reducing agent charge through the reactor, allowing sufficient residence time to effect reduction and chlorination of the ore with good chlorine utilization. It may be found that the lowest gas velocity in the range given above will not carry the highest solids within the stated range, but weight of solids charged and gas velocities must be correlated for efficient operational levels. For a chlorinating reactor about 60 ft. in length, the pressure drop through the reactor will be about 10 lbs./sq. in.

Although it has been established that in the operation of this invention, the total weight of solid reducing agent contained in the reactor is of major importance, the rate of chlorination is dependant on, among other factors, the particle size of both reducing agent and ore. The preferred particle size of the ore is −60 to +100 mesh (Tyler Standard Screen size) with at least about 80% of the particles in this range, and of the solid reductant, −20 to +60 mesh, again with at least about 80% of the particles within this size range.

It will be recognized that many variables such as chlorine concentration, gas flow rates, temperatures, concentration of $TiCl_4$ and other chlorides within the reactor, as well as the amount and particle size of the reducing agent and ore, will determine the efficiency with which the chlorination process can be carried out. With a reactor 60 ft. in length, and 2.7 ft. in diameter, the following have been found to be very satisfactory operation conditions:

To chlorinate titanium dioxide at the rate of 110 moles/hr., the charge of solid reducing agent in the chlorinator at any one time is about 1250 lbs., or about 3 lbs./cu. ft. of reactor volume. The preferred weight ratio of solid reductant (coke) to ore is about 40/60; therefore, the charge of ore (TiO$_2$ content and gangue) in the chlorinator at any one time should be about 5 lbs./cu. ft. The temperature of the combined gas-solids feed to the chlorinator at the point indicated as 2 in the figure should be about 870° C., and the temperature will rise to about 1050° C. as the reaction proceeds in the chlorinator. Chlorine feed rate to react with the TiO$_2$ and impurities is about 225 mol/hr. as Cl$_2$. Total gas flow is about 333 mol/hr. The chlorination rate is increased by increase in temperature, and the maximum temperature for operation of the invention is limited by materials of construction and particle sintering, rather than by kinetics of the reaction. A range of temperature from 850° C. to 1300° C. is possible for satisfactory operation of the dilute-phase reactor; a preferred range is 900–1200° C. Very satisfactory operation of the process is obtained when temperature within the chlorination reaction unit is maintained at about 1000–1100° C. Temperature of operation can be directly correlated to reactor size within these limits, of course; a lower temperature of operation is compensated by larger reactor volume for an equal production rate, achieving over 98% chlorine conversion.

A gas flow rate which has been found adequate to carry the coke/ore charge given in the previous paragraph is about 10 lineal ft./second at the reactor inlet and 17 ft./second at the reactor outlet. Pressure at the reactor inlet is 23 p.s.i.g. and at the outlet about 13 p.s.i.g.

For the operation of the invention any commercially available solid carbonaceous reductant may be used; however, coke is preferred. The most desirable particle size range has been found to be −20 +65 mesh size, with at least about 80% of the particles in this range. It is also considered to be within the realm of this invention, to supplement the action of the solid carbonaceous reducing agent with introduction of gaseous reductants such as phosgene and carbon monoxide. These gases may be introduced into the reactor along with the conveying gases and the charge of solid particles, if desired; alternatively, these reducing gases may be introduced into the reactor through a separate inlet. If the action of the solid reducing agent is supplemented by the introduction of gaseous reducing agents, hydrocarbons should be avoided because of complications and yield losses arising from the formation of water vapor or hydrochloric acid or both within the reactor.

The invention is applicable to the chlorination of any titaniferous ore, the titanium content of which is high enough to make the ore a valuable commercial source of titanium tetrachloride. An ore preferred for the operation of the invention is one in which the TiO$_2$ content is between 45 and 98% of the ore. Excessive gangue accumulation in the chlorinator and associated conduits and cyclones is avoided either by operating at temperatures high enough to chlorinate the gangue, or by periodic disruption of cyclone efficiency by increased flow of nitrogen into the bottom of the cyclone, or by periodic dumping.

What is claimed is:
1. A process for chlorination of titaniferous ores in a continuous reaction system which comprises the steps of:
   (1) continuously charging a stream of reactants through an inlet zone to a reaction zone at the bottom thereof, the reactants comprising (a) solid titaniferous ore particles, (b) solid carbonaceous reducing agent particles (c) gaseous chlorinating agent, (d) recycle gases, and (e) recycle unreacted separated solid particles;
   (2) said reactants being charged in amounts so that the average solids concentration in the reaction zone is about 4 to 8 lbs. per cubic foot, the gas velocity in the reaction zone is about 8 to 40 feet per second, and the reaction zone temperature is about 850° C. to 1300° C.;
   (3) passing said stream of reactants in dilute-phase suspension upwardly through said reaction zone for reaction therein to produce as a reaction product chlorinated titaniferous material;
   (4) withdrawing unreacted reactants and the reaction products from the upper end of said reaction zone and passing them to a separation zone;
   (5) separating the solid particles from the gaseous reactants and reaction products in said separation zone and recycling the separated solid particles along with make up solid reactant particles comprising (a) solid titaniferous ore particles about 80% of which would be sized between 60 and 200 mesh Tyler screens and (b) solid carbonaceous reducing agent particles about 70% of which would be sized between 20 and 60 mesh Tyler screens to the inlet zone of said reaction zone;
   (6) continuously recovering product from said separated unreacted gaseous reactants and reaction products recovered in said separation zone, and passing said unreacted gaseous reactants and additional gaseous chlorinating agent to the inlet zone of said reaction zone.

2. The process of claim 1 wherein TiO$_2$ content is between about 45 and 98% of the ore.

3. The process of claim 1 wherein the said reducing agent is coke.

4. The process of claim 3 wherein at least about 80% of the said coke has a particle size between about −20 and +65 mesh size.

References Cited

UNITED STATES PATENTS

| | | | |
|---|---|---|---|
| 2,855,273 | 10/1958 | Evans et al. | 23—87 |
| 2,856,264 | 10/1958 | Dunn | 23—87 |
| 2,868,622 | 1/1959 | Bennett et al. | 23—87 |
| 2,936,217 | 5/1960 | Andersen | 23—87 |
| 3,050,362 | 8/1962 | Oppegaard et al. | 23—87 |
| 3,086,843 | 4/1963 | Evans et al. | 23—87 |
| 3,228,751 | 1/1966 | Irani | 23—87 |

EDWARD STERN, Primary Examiner